United States Patent
McKiernan

(10) Patent No.: US 8,656,524 B2
(45) Date of Patent: Feb. 25, 2014

(54) TOILET ASSEMBLY

(75) Inventor: Edward McKiernan, Wooster, OH (US)

(73) Assignee: Dometic Corporation, Big Prairie, OH (US)

( * ) Notice: Subject to any disclaimer, the term of this patent is extended or adjusted under 35 U.S.C. 154(b) by 833 days.

(21) Appl. No.: 12/881,550

(22) Filed: Sep. 14, 2010

(65) Prior Publication Data

US 2011/0061156 A1 Mar. 17, 2011

Related U.S. Application Data

(60) Provisional application No. 61/242,100, filed on Sep. 14, 2009.

(51) Int. Cl.
*E03D 9/10* (2006.01)
*E03D 11/11* (2006.01)

(52) U.S. Cl.
CPC . *E03D 9/10* (2013.01); *E03D 11/11* (2013.01)
USPC ........................................ 4/319; 4/320; 4/321

(58) Field of Classification Search
CPC .................................. E03D 9/10; E03D 11/11
USPC .............................................. 4/319–321, 323
See application file for complete search history.

(56) References Cited

U.S. PATENT DOCUMENTS

| 4,032,995 A * | 7/1977 | Kemper ............................. 4/319 |
| 4,159,550 A * | 7/1979 | Tobin, Jr. ........................... 4/319 |
| 4,271,540 A * | 6/1981 | Clifton .............................. 4/319 |
| 4,324,007 A * | 4/1982 | Morris ............................... 4/321 |
| 4,516,281 A * | 5/1985 | MacPherson et al. ............. 4/319 |
| 6,412,121 B2 * | 7/2002 | Motoyama ........................ 4/319 |
| 6,871,361 B2 | 3/2005 | Grech et al. |
| 2007/0113330 A1 * | 5/2007 | Miller et al. ...................... 4/319 |

* cited by examiner

*Primary Examiner* — Tuan N Nguyen
(74) *Attorney, Agent, or Firm* — Pearne & Gordon LLP

(57) ABSTRACT

A toilet assembly for use in a vehicle includes a toilet, a macerator assembly for receiving material from the toilet, and a holding tank in association with the macerator assembly along a discharge tube. The material is configured to pass from the macerator assembly, through the discharge tube, and to the holding tank. A mounting structure is further included for attaching the discharge tube to a supporting surface. The mounting structure includes a floor flange attached to the supporting surface, an adapter plate assembly, and a seal positioned between the adapter plate assembly and floor flange. The adapter plate assembly is sealingly engaged with the discharge tube, such that the discharge tube is sealed with the supporting surface.

18 Claims, 3 Drawing Sheets

TOILET ASSEMBLY

CROSS-REFERENCE TO RELATED APPLICATIONS

This application claims the benefit of U.S. provisional application No. 61/242,100 filed Sep. 14, 2009 for a "No Chemical Toilet".

BACKGROUND OF THE INVENTION

1. Field of the Invention

The present invention relates generally to toilets, and more particularly, to toilets that can be used in vehicles, including recreational vehicles, boats, and the like.

2. Description of Related Art

One major benefit of modern recreation vehicles is that they are equipped with a complete bathroom facility which includes a flushing toilet, a shower with hot and cold water supply and a sink. These amenities can be used while the vehicle is disconnected from external water supply or sewer connection. RV's equipped with fixed toilets are also typically fitted with holding tanks that are mounted under the floor of the vehicle and located directly under the toilet. These toilets are commonly referred to as "gravity discharge" toilets, as shown in FIGS. 1 and 2. In some cases, where the vehicle is fitted with two bathrooms, one toilet is gravity discharge and mounted directly over the holding tank and the other is located remotely. Remote toilets transport waste from the toilet to the holding tank via a pump to flush water and waste or a vacuum transfer system that moves the flush water and waste via air pressure.

FIGS. 1 and 2 show an example where a toilet 110 is mounted directly above a holding tank 130. As shown, solid waste 104 and tissue tends to accumulate directly underneath a first opening 112 and second opening 114 of the toilet 110. The main source of odor from the holding tank 130 is the condition in which solid waste 104 and tissue accumulate directly under the openings 112, 114 of the toilet. Liquid waste 102 that enters the holding tank can fill the bottom area of the tank. The solid waste 104 accumulates in a pile or mound that can extend well above the top level of the liquid waste 102.

A deodorizing chemical may be added to the holding tank to reduce the odors that are emitted from the tank. However, these chemicals can contain strong biocides and sometimes emit an unpleasant odor from the chemical itself. Formaldehyde is a common active ingredient in these products. When deodorizers are added to the holding tank 130, the deodorizers run off the mound of solids and into the retained liquid. Thus, the waste above the liquid level 102 is extremely odiferous and is unaffected by the added deodorants. In addition, the presence of the mound of solid waste 104 can restrict the odors from reaching the exit vent.

These holding tanks are usually vented through a 1½-inch pipe that extends from the top of the tank through the roof of the trailer or motorhome. Gravity toilets have a mechanically operated valve positioned at a base 116 of the toilet bowl which opens during flushing allowing the flush water and waste to fall directly into the holding tank 130. A small amount of water is injected into the bowl while the valve is open to rinse the bowl surface. After the valve is closed, the flush water continues to briefly run into the bowl to leave a small amount above the flush valve to prevent waste odors from entering the living space of the vehicle. Waste passes from the second opening 114 and the base 116 to the holding tank 130 along a discharge tube 122. The discharge tube can be attached to a support surface 142, such as a floor, by an adapter 140 and seal 152. Further, a 3-inch sealing grommet 124 may be used to attach the discharge tube 122 to the holding tank 130.

The known toilet/holding tank system as described above emits very unpleasant odors when the toilet is flushed. Today there is a growing number of RV enthusiasts that spend upwards of 200 days each year living in their trailer or motorhome. Living in a confined space and having an unpleasant odor in the living area is a major discomfort to the occupants. They frequently add more deodorizing chemicals to the holding tank with no sustained relief from the problem. It is estimated that an average couple will spend between $150 to $250 per year for deodorizing chemicals.

Frequently, heavier than air malodors accumulate in the tank and are expelled into the bathroom when the toilet valve is opened. It is not uncommon for a negative pressure to exist inside the vehicle or trailer due to ventilation fans or cross winds over the exterior windows (if left open). Thus the malodors can be sucked into the living space the moment the toilet valve is opened.

BRIEF SUMMARY OF THE INVENTION

In accordance with one aspect, a toilet assembly is provided. The toilet assembly includes: a toilet; a macerator assembly coupled to the toilet; a holding tank coupled to the macerator assembly via a discharge tube; and an adapter plate sealingly attached to the discharge tube.

In accordance with another aspect, a toilet assembly is provided. The toilet assembly includes: a toilet provided on a support surface; a holding tank coupled to the toilet via a discharge tube, such that material from the toilet passes through the discharge tube and to the holding tank; a floor flange secured to the support surface, the floor flange having an opening that defines a passageway through the support surface to the holding tank; and an adapter plate positioned between the floor flange and the toilet, the adapter plate configured to provide a sealed connection between the discharge tube and the holding tank.

In accordance with another aspect a toilet assembly is provided. The toilet assembly includes: a toilet; a discharge tube in operative association with the toilet; a holding tank configured to receive material from the toilet via the discharge tube; and a mounting structure configured to attach the discharge tube to a supporting surface, the mounting structure including: a floor flange attached to the supporting surface; an adapter plate assembly attached to the floor flange, wherein the adapter plate assembly includes at least one aperture, further wherein the at least one aperture is configured to receive the discharge tube; and a seal configured to be positioned between the adapter plate assembly and the floor flange, such that the adapter plate assembly and the floor flange are sealingly attached.

DETAILED DESCRIPTION OF THE INVENTION

Figure 1A:
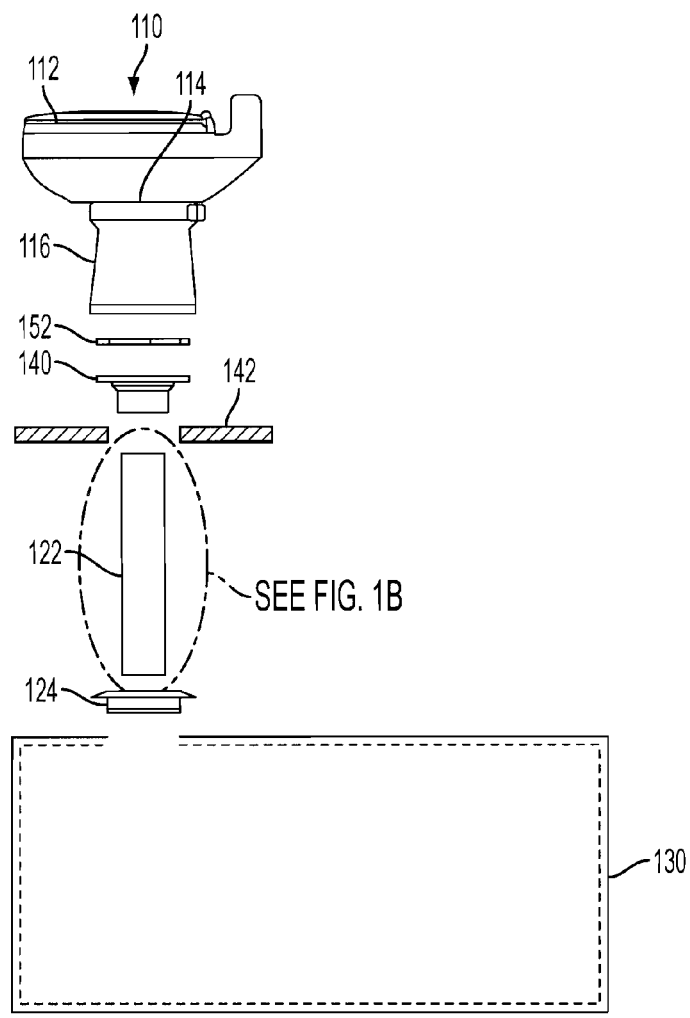
FIG. 1 is an exploded view of a conventional toilet assembly positioned directly above a holding tank.

Example embodiments that incorporate one or more aspects are described and illustrated in the drawings, in which like reference numerals are used to refer to like elements throughout. It is to be appreciated that the various drawings are not drawn to scale from one figure to another nor inside a given figure, and in particular that the size of the components are arbitrarily drawn to facilitate the reading of the drawings. These illustrated examples are not intended to be a limitation. For example, one or more aspects can be utilized in other embodiments and even other types of devices. Moreover, certain terminology is used herein for convenience only and is not to be taken as a limitation on the apparatus. Still further, in the drawings, the same reference numerals are employed for designating the same elements.

Figure 3:
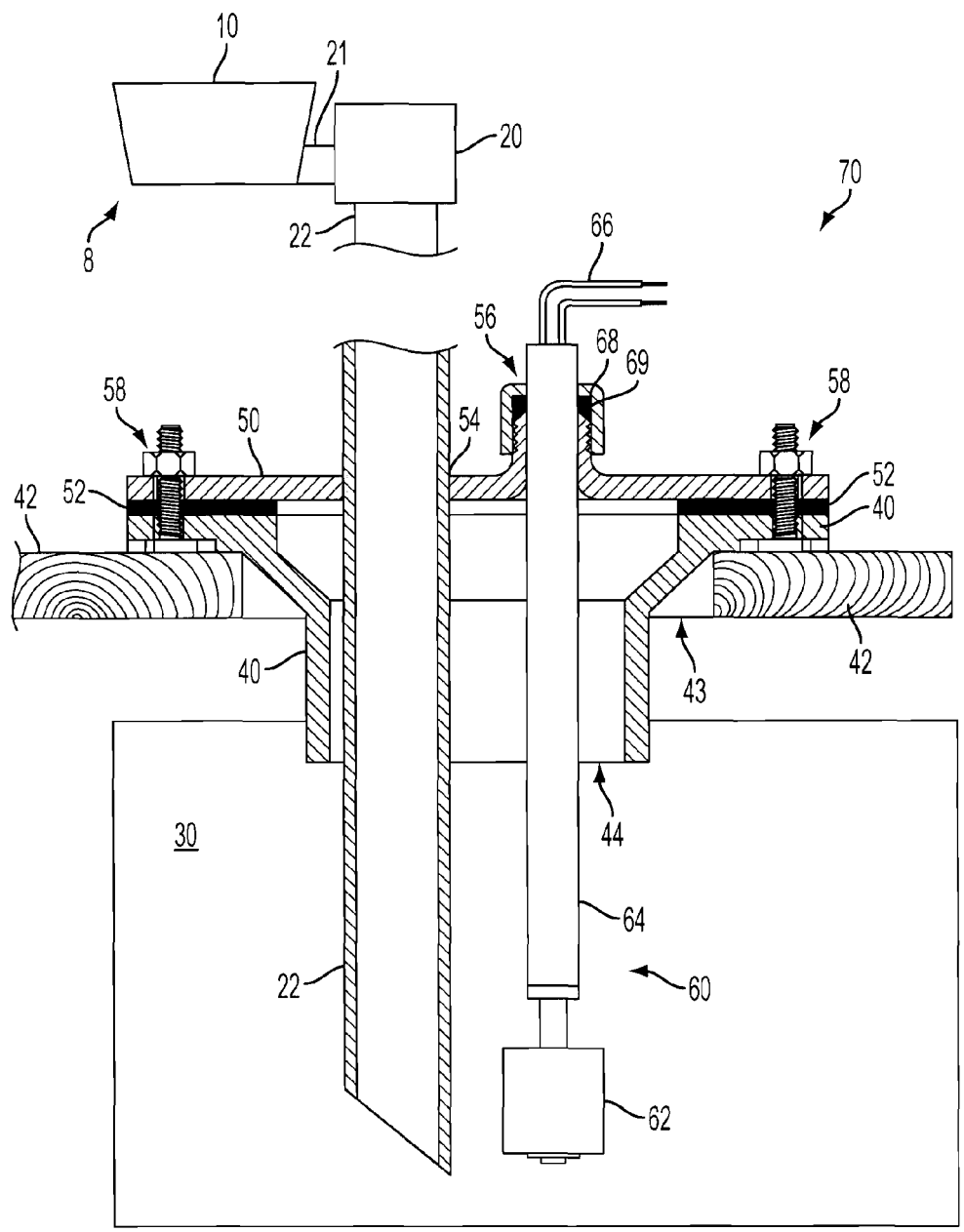
FIG. 3 is a sectional view of an example toilet assembly that includes an example adapter plate assembly.

FIG. 3 provides an illustration of an example toilet assembly 8. The toilet assembly 8 may include a toilet 10, a macerator assembly 20, a holding tank 30, and a mounting structure 70. The toilet assembly 8 and macerator assembly 20 can break down and blend waste and water material to have a consistent texture. The blended waste and water material may then be transferred to the holding tank 30. As will be explained in detail below, the toilet assembly 8 is configured to prevent odors from being transported from the holding tank 30 to the toilet 10.

Figure 1B:
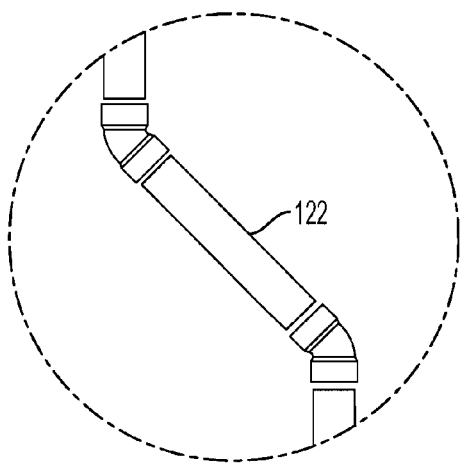
Figure 2:
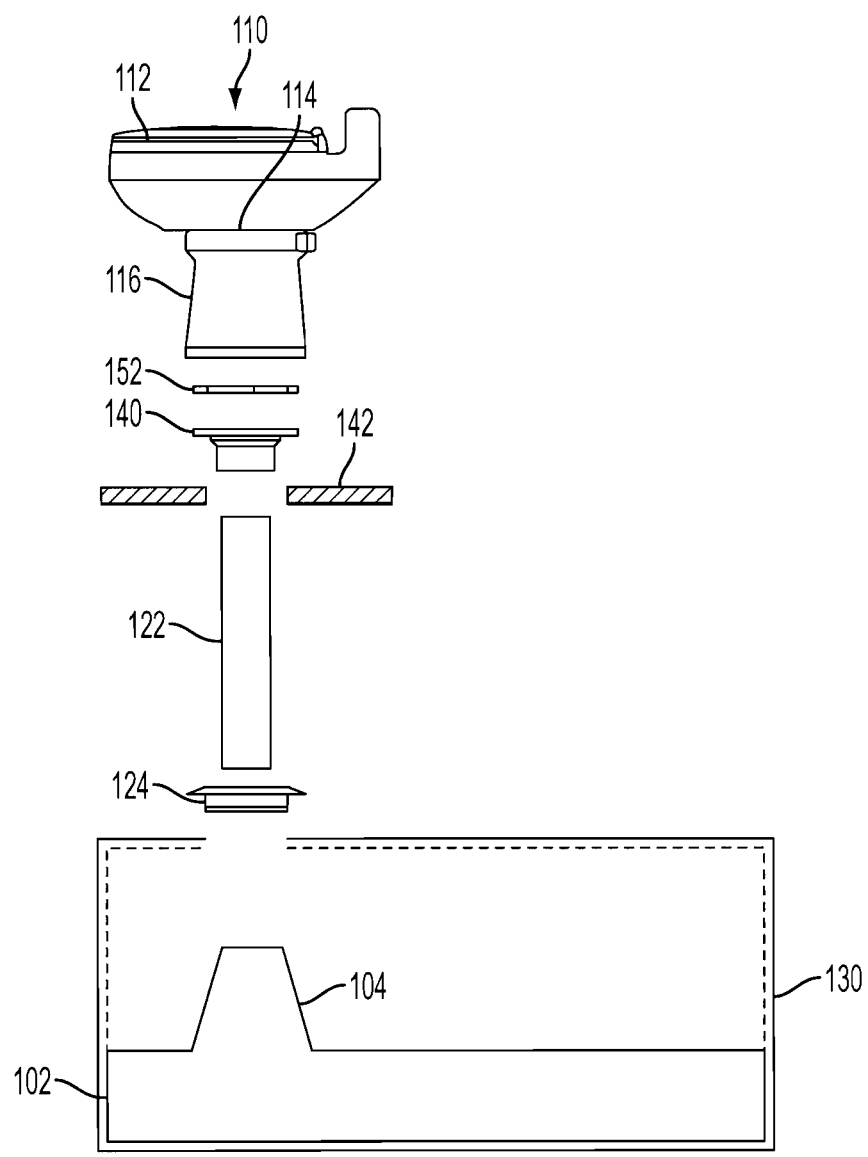
FIG. 2 is an exploded view of the conventional toilet assembly of FIG. 1 with the holding tank full of solid and liquid waste.

The toilet 10 shown represents various toilet configurations that can be used for collecting waste. It is to be understood, however, that the toilet 10 in FIGS. 1-3 is shown schematically and is not drawn to size. For instance, various types of toilets can be configured for use in various vehicles, such as, for example, boats, ships, or recreational vehicles, and can also be configured for use in a stationary structure, such as a home, or other building. Similarly, the toilet bowl can have a variety of configurations, such as a generally concave configuration. The example toilet 10 can include a toilet bowl configured to receive excrement, debris, and/or fluid from a user. The toilet bowl can include various rigid materials, such as, for example, ceramic, porcelain, metal, and/or plastic. The toilet 10 may include a first opening disposed towards the top of the main body portion and a second opening disposed towards the bottom of the main body portion directed to the macerator assembly 20. The first opening of the toilet 10 can be configured to receive excrement, debris, and/or fluids from a user and the second opening can be configured to permit the excrement, debris and/or a fluid to exit the toilet bowl. The second opening can be oriented horizontally, vertically, or at an angle to deliver the waste and water to the macerator assembly 20.

The macerator assembly 20 is used for breaking down and blending waste and water material. The macerator assembly 20 is readily available, such as those commercially available from Dometic Corporation and other manufacturers. The macerator assembly 20 is shown schematically and is not drawn to size or limited to any particular configuration. For instance, the macerator assembly 20 can be positioned outside of and adjacent to the main body portion of the toilet 10, as shown. Similarly, the macerator assembly 20 can be positioned outside of and downstream from the main body portion of the toilet 10. Alternatively, the macerator assembly 20 can be placed completely within the main body portion of the toilet 10. Waste and flush water may be delivered from the second opening of the toilet 10 along a discharge conduit 21 to the macerator assembly 20. The waste and flush water are thoroughly broken down, blended, and/or mixed by the macerator assembly 20 to form a waste material having a consistent texture such that fewer solids remain. The macerator assembly 20 can prevent some or all solids from being transported to the holding tank 30 that receives the waste.

The macerator assembly 20 can include a turbine pump (not shown) for breaking down the waste. The turbine pump can be located on a down leg of the discharge conduit 21. The discharge conduit 21 may connect the second opening of the toilet 10 with the macerator assembly 20 to transport the waste from the toilet 10. As described above with regard to the second opening, the discharge conduit 21 can have any suitable orientation, such as a horizontal, vertical, or angled orientation. When the toilet is flushed, the turbine pump of the macerator assembly 20 starts at a very high speed creating a negative pressure between the macerator assembly 20 and the toilet 10, causing siphonic action to remove the waste and flush water from the bowl. Thus, the toilet 10 with the macerator assembly 20 creates a water trap seal.

Use of the macerator assembly 20 prevents a mound of solid waste from accumulating in the holding tank 30 in any one location. Instead, a generally level amount of waste material is deposited in the holding tank 30 without piles of solid waste extending above the liquid waste. The level amount of waste material in the holding tank reduces or prevents odors from rising upwards and into the toilet 10. One of the reasons for the reduction in odors is that the waste material is now substantially in liquid form and does not have solids that are sitting out in the open in a mound. Another reason for the reduction in odors is due to the seal formed between the water trap (not shown) in the bowl and the passage to the holding tank 30. The water trap in the bowl is re-established after the flushing operation and the seal prevents the odors from travelling upwards towards the toilet. Another reason for the reduction in odors is that the elimination of the mound allows the odors to reach an exit vent (not shown) in the holding tank that the odors are designed to exit from, as opposed to the mound of solid waste restricting the passage of the odors. Thus, in any of the examples, the user does not need to apply any chemicals, as the toilet is configured to restrict or prevent the user from receiving the odors from the holding tank.

After the waste and flush water are moved through the macerator assembly 20, the waste enters the discharge tube 22. The discharge tube 22 can include any type of conduit means used to convey material, such as a hose, pipe, tubing or the like. The discharge tube 22 is configured to transport the waste material from the macerator assembly 20 towards the holding tank 30. The discharge tube 22 can be of any suitable length, depending on the application, and/or could be adjustable in length. For example, a longer length can be provided in a kit and a user can cut the discharge tube 22 to the desired length. In another example, the discharge tube 22 can be telescopic.

A mounting structure 70 is configured to mount the toilet 10 to the holding tank 30. The mounting structure 70 can further attach the discharge tube 22 to a supporting surface 42. As shown in FIG. 3, the mounting structure 70 can include a floor flange 40, an adapter plate 50, one or more apertures 54, 56, and a seal 52.

The floor flange 40 is defined by plumbing codes and is used in almost all RV installations. The floor flange 40 may be fixed to the supporting surface 42, such as the floor of the RV. The supporting surface 42 can include an opening 43 that defines a passageway through the supporting surface 42 to the holding tank 30. The floor flange 40 can have an opening 44, such as a 3-inch diameter opening, though various other sized openings can also be provided. Similarly, the opening 44 can be of any shape, such as circular, oval, square, rectangular, etc.

The adapter plate 50 is provided to allow a smaller dimension of the discharge tube 22 to be used with the larger dimensioned opening 44 of the support surface 42. Because the discharge tube 22 can have a different size (i.e., diameter) than that of the floor flange 40 and opening 44, the discharge tube 22 can be coupled to the floor flange 40 via the adapter plate 50. In one example, the discharge tube 22 can have a 1-inch diameter, as opposed to the 3-inch diameter opening of the floor flange 40. Other dimensions, however, are contemplated. The adapter plate 50 can be formed of a generally rigid material, such as plastic or metal. The adapter plate 50 is configured to provide a sealed connection between the discharge tube 22 from the macerator assembly 20 and the holding tank 30 via the floor flange 40 mounted to the supporting surface 42. FIG. 3 illustrates one example coupling of the discharge tube 22, the adapter plate 50, and the floor flange 40. It is to be appreciated that the adapter plate 50 and the discharge tube 22 can also be provided as a one-piece structure.

The adapter plate 50 can further include a first aperture 54 and a second aperture 56 extending therethrough. The first aperture 54 can be provided in the adapter plate 50 for receiving the discharge tube 22, which is a conduit between the outlet of the macerator assembly 20 and the interior of the holding tank 30. The discharge tube 22 can be sealingly coupled to the adapter plate 50 in a number of ways and can also be secured thereby by a clamp or other mechanical fastener, adhesives, welding, etc. Further, the second aperture 56 can be provided in the adapter plate 50 for receiving an adjustable monitoring tube 64 of a monitoring assembly 60, as will be described. The first aperture 54 or the second aperture 56 can include various shapes and sizes to accommodate various types of sockets, such as an elbow socket to receive either the discharge tube 22 or the monitoring tube 64 from a different orientation. Thus, the adapter plate 50 can include a variety of sockets and other apertures in addition to those structures shown in FIG. 3.

A seal 52 may be provided between the adapter plate 50 and the floor flange 40 and is liquid and odor tight. The seal can include a gasket or any type of sealing apparatus. In addition or alternatively, various structures can be disposed between the generally rigid adapter plate 50 and the floor flange 40. Thus, the adapter plate 50 can be secured to the floor flange 40, such as by mechanical fasteners, adhesives, welding, etc. with the seal 52 positioned in between. In this example, mechanical fasteners 58 may be used such that the adapter plate 50 is bolted to the floor flange 40 with the seal 52 provided between the adapter plate 50 and floor flange 40. Various seals (i.e., o-rings, etc.) can also be provided therebetween on either or both of the adapter plate 50 and the floor flange 40. Alternatively, the toilet can also be installed in a vehicle as a "plug-in" toilet. That is, the toilet can be positioned generally over the floor flange 40, and the adapter plate 50 can be directly or indirectly "plugged-into" the floor flange 40 in a secure manner that does not require external fasteners. The plug-in configuration can also be a friction or interference fit. In other examples, components of the toilet 10, such as the adapter plate 50 and the macerator assembly 20, can be provided individually such that users can retrofit an existing toilet.

Thus, the adapter plate 50 and seal 52 allow the smaller diameter of the discharge tube 22 from the macerator assembly 20 to be sealingly attached within the larger diameter of the floor flange 40. Furthermore, the generally rigid adapter plate 50 can be sealingly coupled to the discharge tube 22 and monitoring tube 64. For example, additional gaskets or adhesives can be used for providing a seal about the discharge tube 22 and the monitoring tube 64. Waste material, including water, excrement, and the like, expelled out of the toilet bowl will travel through the discharge tube 22 and through the floor flange 40, and into the holding tank 30. The seal 52 and sealing connection between the discharge tube 22, monitoring tube 64 and adapter plate 50 limits and/or prevents the waste material from escaping the holding tank 30 and seeping through to the supporting surface.

In further examples, the adapter plate 50 can include additional sockets with or without sealing mechanisms such as O-rings. The adapter plate 50 can also be configured to plug-in the discharge tube 22 and/or the monitoring tube 64. The plug-in connection can be provided in a number of ways, such as by an O-ring groove or through other types of fittings. In further examples, the discharge tube 22 can also be inserted into a bracket or other mechanism (not shown) before being inserted into the adapter plate. The bracket can be configured to keep the discharge tube 22 from flexing while installing the discharge tube 22 in the adapter plate 50. Other ways for securing and sealing the discharge tube 22 and the monitoring tube 64 to the adapter plate 50 can also be provided, such as providing a hose clamp.

The monitoring assembly 60 may be provided to monitor the level of waste in the holding tank 30. The monitoring assembly 60 can take many forms, including, but not limited to, a level sensor, a reed switch, a float switch, or other kinds of sensors and switches. To reduce the likelihood of the holding tank 30 overfilling, the monitoring assembly 60 can prevent the macerator assembly 20 from operating if the holding tank 30 is full. In this example, the monitoring assembly 60 can shut off the macerator assembly 20 when the holding tank 30 is full and/or provide an indication to a user. Without the monitoring assembly 60, the macerator assembly 20 could keep receiving and depositing waste in the holding tank 30 even if no further capacity was present. The monitoring assembly 60 thus helps prevent undesirable spills and helps prevent the occurrence of damage to the holding tank 30. The monitoring assembly 60 can also further include an indicator (not shown). The indicator can provide an indication, such as a sound, a light, or a visual indication to alert a user that the holding tank 30 is full and/or has reached a predetermined level, and that the macerator assembly 20 of the toilet 10 will not operate without the holding tank 30 being at least partially emptied.

In one example of the monitoring assembly 60, a float switch 62 may be provided on a monitoring tube 64 that can be adjustable. The float switch 62 may be attached about an end portion of the monitoring tube 64. The monitoring tube 64 can be adjustable in length such that a longer length can be provided and a user can cut the monitoring tube 64 to the desired length. In the example shown, a nut 68 can be provided at the top of the monitoring tube 64 for adjusting the position of the monitoring tube 64. In this example, the nut 68 can be loosened and the monitoring tube 64 can be slid downwards, such that the float switch 62, or a probe, is slid down into the holding tank 30. Other mechanical connectors and devices can be used in place of the nut 68, which is just one example of allowing the monitoring tube 64 to be adjusted.

Wires 66 may be provided within the monitoring tube 64 running from the float switch 62 to a location separate from the monitoring assembly 60. During the initial installation, the excess tubing of the monitoring tube 64 may be cut off at the top without cutting any wires 66 from the float switch 62 that pass through the monitoring tube 64. The wires 66 can be provided to transport the signal or state detected by the sensor or the float switch. The wires 66 can be connected to any other part of the toilet 10, such as a control module, such that the detection by the wires can deactivate the macerator assembly 20 and prevent the toilet assembly from flushing.

To complete the assembly, the nut 68 may be tightened and any electrical connections may be made. The nut 68 can further include a seal 69 for sealing the monitoring tube 64 relative to the adapter plate 50. The seal 69 may be conical in shape and conforming to the round shape of the monitoring tube 64. The seal 69 may be sized to fit inside of a boss that nut 68 is screwed onto to provide a seal and limit or reduce the amount of material passing from the holding tank 30 through the second aperture 56. It is to be understood, however, that the seal 69 may take a variety of shapes, such as a circular O-ring shape, oval shape, conical shape etc. Similarly, the seal 69 may be made of an elastomer material, such as rubber, or a variety of other sealing materials. The monitoring assembly 60 is therefore configured to allow one to adjust a position of the float switch 62. Consequently, a user may have the monitoring assembly 60 disable the macerator at a lower fill level or at a higher fill level than the monitoring assembly 60 is currently set, depending on the predetermined position of the float switch 62. In another example, the monitoring tube 64 can be telescopic.

The discharge tube 22 can extend to a position below a lower-most position of the float switch 62 in the holding tank 30. This positioning may reduce the likelihood of waste entering the holding tank 30 and splashing and/or prematurely triggering the float switch 62. Protecting the float switch 62 from inadvertent activation or interference from the waste of the discharge tube 22 may limit the toilet from being inadvertently disabled. Both the discharge tube 22 and the monitoring tube 64 for the float switch 62 can be cut to the correct length to fit the specific shape of the holding tank 30.

The operation of the toilet assembly 8 may now be described. The first example toilet 10 can be provided. The discharge conduit 21 defines a flow path from the toilet 10 to the macerator assembly 20. The macerator assembly 20 is configured to break down the waste and water it receives from the toilet 10. The macerator assembly 20 disposes the broken down and blended waste and water through the discharge tube 22 to the holding tank 30. The adapter plate 50 is provided above floor flange 40 that is located on the opening 43 to the holding tank 30. The adapter plate 50 is configured to provide a sealed connection between the discharge tube 22 of the macerator assembly 20 and the holding tank 30 despite the different diameters of the discharge tube 22 and the floor flange 40. In one example, the monitoring assembly 60 may be provided. The monitoring assembly 60 is configured to monitor the level of waste material in the holding tank 30 to prevent the toilet 10 from flushing if the holding tank 30 has a reduced amount of capacity remaining.

In one example, the monitoring assembly 60 can include the float switch 62 that is mounted on the adjustable monitoring tube 64 within the holding tank. The adjustable monitoring tube 64 is configured to be adjusted by a user to a specific level within the holding tank. The adapter plate 50 includes the first aperture 54 and the second aperture 56 for receiving the discharge tube 22 and the monitoring tube 64. The first aperture 54 and the second aperture 56 can include various securing mechanisms or sockets to seal or secure the reception of the discharge tube 22 and the monitoring tube 64. In an alternative example, the discharge tube 22 can end at a position closer to the bottom of the holding tank 30 than the monitoring tube 64 to ensure that the float switch 62 detects an accurate reading of the level of the holding tank 30. In another alternative example, the monitoring assembly 60 can include an indicator that is configured to use audible or visual mechanisms for indicating to a user that the holding tank is relatively full and that the toilet will not flush until the holding tank is at least partially emptied.

Gaskets or other securing mechanisms can be disposed between the adapter plate 50 and the floor flange 40 as well as various fasteners for securing the adapter plate 50 to the floor flange 40. Alternatively, the adapter plate 50 can plug into the floor flange 40. In the shown example, the seal 52 is provided between the adapter plate 50 and floor flange 40.

It should be evident that this disclosure is by way of example and that various changes may be made by adding, modifying or eliminating details without departing from the scope of the teaching contained in this disclosure. What has been described above includes exemplary implementations. It is, of course, not possible to describe every conceivable combination of components or methodologies, but one of ordinary skill in the art will recognize that many further combinations and permutations are possible.

What is claimed is:

1. A toilet assembly, comprising:
a toilet comprising a discharge outlet;
a macerator assembly coupled to the discharge outlet of the toilet;
a discharge tube downstream from the macerator assembly and coupled to an output of the macerator assembly;
a holding tank coupled to the macerator assembly via the discharge tube;
an electrically-operated monitoring assembly configured to monitor an amount of material in the holding tank and further configured to prevent operation of the macerator assembly when the material in the holding tank reaches a predetermined level; and
an adapter plate coupled to a support surface about an opening of the support surface that is in communication with the holding tank, and sealingly attached to the discharge tube,
wherein the adapter plate includes a first aperture therein for receiving the discharge tube and the adapter plate includes a second, independent aperture adjacent to the first aperture for receiving the monitoring assembly, and
wherein the monitoring assembly is adjustably attached to the adapter plate such that a position of the monitoring assembly within the holding tank can be adjusted.

2. The toilet assembly of claim 1, further comprising a floor flange secured to the adapter plate.

3. The toilet assembly of claim 2, further comprising a seal positioned between the floor flange and the adapter plate.

4. The toilet assembly of claim 1, wherein the adapter plate assembly is configured to sealingly hold the monitoring assembly such that the monitoring assembly extends at least partially into the holding tank.

5. The toilet assembly of claim 4, wherein the monitoring assembly includes a float switch.

6. The toilet assembly of claim 1, wherein the discharge tube extends through the adapter plate assembly and at least partially into the holding tank.

7. The toilet assembly of claim 6, wherein the discharge tube extends to a position below a lower-most position of the monitoring assembly in the holding tank.

8. A toilet assembly, comprising:
a toilet provided on a support surface;
a holding tank coupled to the toilet via a discharge tube, such that material from the toilet passes through the discharge tube and to the holding tank;
a floor flange secured to the support surface, the floor flange having an opening that defines a passageway through the support surface to the holding tank; and
an adapter plate positioned between the floor flange and the toilet, the adapter plate configured to provide a sealed connection between the discharge tube and the holding tank, further comprising an electrically-operated monitoring assembly configured to monitor the amount of the material in the holding tank, wherein the adapter plate includes a first aperture through which the discharge tube is provided and the adapter plate includes a second, independent aperture adjacent to the first aperture for receiving the monitoring assembly such that both of the discharge tube and the monitoring assembly pass through the passageway of the support surface, and wherein the discharge tube extends to a position below a lower-most position of the monitoring assembly in the holding tank.

9. The toilet assembly of claim 8, further comprising a macerator to mitigate an accumulation of waste in the holding tank.

10. The toilet assembly of claim 8, wherein the adapter plate and the discharge tube are formed as a one-piece structure.

11. The toilet assembly of claim 8, further comprising a seal provided between the adapter plate and the floor flange.

12. A toilet assembly, comprising:
a toilet;
a discharge tube in operative association with the toilet;
a holding tank configured to receive material from the toilet via the discharge tube;
an electrically-operated monitoring assembly configured to monitor an amount of material in the holding tank; and
a mounting structure configured to attach the discharge tube to a supporting surface, the mounting structure including:
a floor flange attached to the supporting surface;
an adapter plate assembly attached to the floor flange, wherein the adapter plate assembly includes a first aperture that is configured to receive the discharge tube and the adapter plate includes a second, independent aperture adjacent to the first aperture for receiving the monitoring assembly; and
a seal configured to be positioned between the adapter plate assembly and the floor flange, such that the adapter plate assembly and the floor flange are sealingly attached.

13. The toilet assembly of claim 12, further including a macerator assembly, wherein the macerator assembly blends the material to form a waste material having a substantially consistent texture.

14. The toilet assembly of claim 12, wherein the supporting surface defines an opening, further wherein the floor flange and discharge tube pass at least partially through the opening.

15. The toilet assembly of claim 14, wherein a diameter of the opening of the supporting surface is configured to be larger than a diameter of an opening in the floor flange.

16. The toilet assembly of claim 15, wherein a diameter of the discharge tube is configured to be smaller than the diameter of the opening in the floor flange.

17. The toilet assembly of claim 12, wherein the discharge tube extends to a position below a lower-most position of the monitoring assembly in the holding tank.

18. The toilet assembly of claim 12, wherein the monitoring assembly is adjustably attached to the adapter plate such that a position of the monitoring assembly within the holding tank can be adjusted.

* * * * *